Patented June 2, 1931

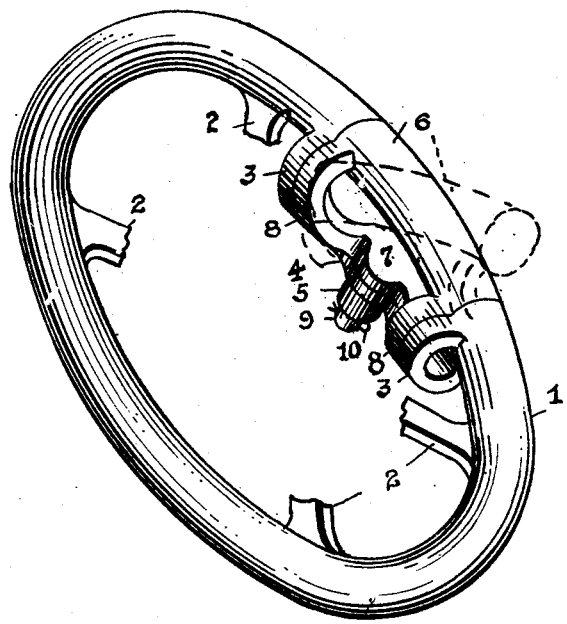

1,808,485

UNITED STATES PATENT OFFICE

JOSEPH E. WHITFIELD, OF PITTSBURGH, PENNSYLVANIA, ASSIGNOR TO WHITFIELD-JOHNSON MOTOR COMPANY, OF PITTSBURGH, PENNSYLVANIA, A CORPORATION OF DELAWARE

HAND WHEEL

Application filed August 7, 1929. Serial No. 384,118.

Although highly useful in connection with hand wheels which are employed in numerous arts, such as to turn rods, stems, shafts or other objects, I have particularly designed my invention for use in connection with steering wheels of motor vehicles, motor vessels and the like.

In the case of steering wheels now in use, the annular rim which is grasped by the hands is continuous and in one piece so that in turning a corner or otherwise changing the direction of the vehicle's travel, the hand or hands must be shifted on the rim, and, after the turn has been made, must be shifted back again to hold the vehicle in a straight line of travel.

This shifting of the hands is awkward and involves unnatural twisting of the wrists, and control of the vehicle is rendered imperfect.

The object which I have in view is such an improvement of the hand wheel as will permit and facilitate turning the wheel as required without involving unnatural twisting of the wrist or the impairment of the control of the operator.

I accomplish this and other objects by providing the rim of the hand wheel with an interruption which is occupied by a rim section mounted to swing on an axial line intersecting the rim, said section being grasped by a hand of the operator, and as the operator turns the wheel, the rim section swings on its axis to permit the operator's wrist to turn naturally so that the wrist is not strained nor is the operator's control of the wheel in any manner impaired.

I provide means whereby the movable rim section may be locked in place to complete the rim.

In the accompanying drawings, wherein I have illustrated the principles of my invention applied to the steering wheel of a motor vehicle, Fig. 1 is a perspective view of the steering wheel with the steering post omitted and the spokes broken away, the movable rim section being shown in full lines completing the wheel rim and in dotted lines swing into angular relation to the rim.

Fig. 2 is a broken plan view of the rim showing the movable rim section alined with the rim in full lines and swing into angular relation in dotted lines.

Fig. 3 is a broken elevation looking from below in Fig. 2.

Fig. 4 is a sectional view taken along the line 4—4 in Fig. 3.

Referring to the drawings, 1 represents the rim of a steering wheel and 2 the spokes which connect it to the steering shaft or its central hub which is not shown.

At a place convenient to the hand of the driver in normal driving, the rim is provided with a gap or interruption which is bridged from below by a saddle which comprises the legs 3 and the bridge piece 4.

The legs 3 are rigidly secured at their upper ends to the rim adjacent to the ends thereof and are arcuate being curved inwardly and downwardly and then outwardly, as best shown in Fig. 4. The bridge piece 4 connects the lower ends of the legs and its center is alined with the center of the rim on a line parallel with the axial line of the steering wheel.

The legs and bridge piece are preferably integral and serve to brace the rim 1 and maintain it rigid.

At its center the bridge piece 4 is provided with a cylindrical socket 5, the axis of whose bore is parallel with the axial line of the steering wheel.

6 represents the movable rim section which when in place, as indicated in full lines in the drawings, completes the rim 1 and thus forms with the latter a full circle, the ends of the rim 1 and the section 5 being shaped to fit neatly together, while permitting relative movement.

The rim section 6 is mounted on a saddle 7 by means of the legs 8 which correspond in shape with the legs 3 and are positioned between the latter when the section is alined with the rim, and likewise when the section is so alined, the saddle 7 is parallel and above the bridge piece 4. The legs 8 are spaced apart sufficiently to give clearance for the hand.

The center of the saddle 7 is provided with a cylindrical stem 9 which is journaled in the socket 5 and preferably protrudes slightly below the latter so that a cotter pin 10 or other convenient means to hold the stem in the socket may be used.

The saddle preferably bears on the upper end of the socket 5 and thus clears the bridge 4.

Means are provided for locking the movable rim section in position for completing the annulus of the rim. Thus I have shown a locking pin 11 occupying a cylindrical hole 12 in one of the legs 3 and arranged to engage a hole 13 in the adjacent leg 8. The outer end of the pin is formed with a finger knob, and the pin is also provided with two circumferentially disposed grooves 14 and 15. A second hole 16 in the leg 3 intersects the hole 12, and 17 represents a ball in the inner end of the hole 16 resiliently pressed against the pin 11 by the spring 18 which is held in the hole 16 as by means of the screw plug 19.

When the pin 11 is retracted to unlock the movable rim section, the ball 17 engages the inner groove 14 of the pin and holds the latter in its retracted position.

When the movable rim section is swung into its rim-completing position, the pin 11 may be thrust inwardly to engage the hole 13 in the leg 8 and the ball 17 will then engage the outer groove 15, thus preventing accidental unlocking of the movable rim section.

Normally the pin 11 is held retracted and the driver clasps with one hand the movable rim section while his other braced lightly grasps the rim 1 at another point.

In steering the driver swings the wheel in the proper direction by means of his hand which grasps the movable rim section 6 which swings on its stem 9 in the socket 5, thus providing a natural wrist movement which will not tire the driver and which will facilitate the turning of the wheel. Thus curves and turns may be made safely at much higher speeds than are now reasonably possible, and the response of the vehicle to a change in direction is much easier and more prompt.

If desired two of my movable rim sections may be provided at the proper interval in the rim, so that both hands may be used to grasp the sections.

If desired, the movable rim sections may be locked in position to complete the annulus of the rim and the wheel then be used as an ordinary steering wheel.

The arcuate shape of the legs 3 and 8 prevents their interfering with the hands clasping the rim or the movable rim section or being slid along the same.

It will be noted that my invention greatly improves the control that the driver has over the steering wheel as he maintains his hold thereon without shifting.

Although my invention possesses very marked advantages in relation to steering wheels, it is obvious that it may be applied to many other types of hand wheels with similar advantage. Thus it is highly useful in connection with the hand wheels of valves and gates, and also the hand brakes of railway cars and the like.

What I claim is:

1. In a hand wheel, the combination of a rim having an interrupting gap, and a movable rim section mounted so as to be swung in a path lying within the same plane as that of the first mentioned rim into and out of completing relation with the rim.

2. In a hand wheel, the combination of a rim having an interrupting gap, and a movable rim section mounted so as to be swung into and out of completing relation with the rim, the axis of movement of the movable rim section being parallel with the axis of the hand wheel.

3. In a hand wheel, the combination of a rim having an interrupting gap, a support bridging said gap, and a movable rim section mounted on said support and arranged to be swung into and out of completing relation with the rim, the axis of movement of the movable rim section being parallel to the axis of the hand wheel.

4. In a hand wheel, the combination of a rim having an interrupting gap, a support bridging said gap, and a movable rim section mounted on said support and arranged to be swung into and out of completing relation with the rim, said support being arranged to provide clearance for the hand, the axis of movement of the movable rim section being parallel to the axis of the hand wheel.

5. In a hand wheel, the combination of a rim having an interrupting gap, a support bridging said gap, a saddle structure mounted to swing on said support, and a rim section mounted on the saddle structure and arranged to swing therewith into and out of completing arrangement with the rim, the axis of movement of the movable rim section being parallel to the axis of the hand wheel.

6. In a hand wheel, the combination of a rim having an interrupting gap, a support bridging said gap, a saddle structure mounted to swing on said support, and a rim section mounted on the saddle structure and arranged to swing therewith into and out of completing arrangement with the rim, said support and saddle structure being arranged to provide clearance for the hand, the axis of movement of the movable rim section being parallel to the axis of the hand wheel.

7. In a hand wheel, the combination of a rim having an interrupting gap, a movable rim section mounted so as to be swung into and out of completing relation with the rim, and means for locking the rim section in such relation, the axis of movement of the movable rim section being parallel to the axis of the hand wheel.

8. In a hand wheel, the combination of a rim having an interrupting gap, a support bridging the gap, a movable rim section mounted on the support to be swung into and out of completing relation with the rim, and means to lock the rim section in such completing relation, the axis of movement of the movable rim section being parallel to the axis of the hand wheel.

Signed at Pittsburgh, Pa., this 3rd day of August, 1929.

JOSEPH E. WHITFIELD.